United States Patent [19]
Taylor

[11] 3,794,289
[45] Feb. 26, 1974

[54] PRESSURE CONDUCTING PROBE RECEIVING PLUG

[76] Inventor: Julian S. Taylor, 8600 S.W. 8, Oklahoma City, Okla. 73128

[22] Filed: Dec. 27, 1971

[21] Appl. No.: 214,916

Related U.S. Application Data

[63] Continuation-in-part of Ser. Nos. 876,349, Nov. 13, 1969, Pat. No. 3,630,080, and Ser. No. 89,682, Nov. 16, 1970, abandoned.

[52] U.S. Cl...... 251/149.7, 137/614.19, 137/614.11
[51] Int. Cl................................................ F16l 29/00
[58] Field of Search .... 251/149.7; 137/613, 614.11, 137/614.13, 614.14, 614.19, 375, 365, 223, 251

[56] References Cited
UNITED STATES PATENTS

| | | | |
|---|---|---|---|
| 1,865,231 | 6/1932 | Buck | 137/223 |
| 3,438,179 | 4/1969 | Jouault | 137/251 X |
| 3,202,183 | 8/1965 | Frenzel | 137/614.19 X |
| 3,292,651 | 12/1966 | Innocenti | 137/614.19 X |
| 3,258,026 | 6/1966 | Weaver | 137/375 |
| 2,776,673 | 1/1957 | Goodman et al. | 137/613 X |
| 3,342,205 | 9/1967 | Quinto | 137/365 |

*Primary Examiner*—Samuel Scott
*Assistant Examiner*—Ira S. Lazarus
*Attorney, Agent, or Firm*—Robert K. Rhea

[57] ABSTRACT

A vacuum and pressure probe receiving plug comprising a generally cylindrical centrally bored body threadedly connected at one end with the wall of a vessel containing a vacuum or fluid under pressure. The body is counterbored from its vessel connected end for receiving a cartridge containing a spring urged valve means movable toward and away from the vessel wall providing and interrupting fluid communication through the counterbore.

12 Claims, 8 Drawing Figures

PATENTED FEB 26 1974 3,794,289

PRESSURE CONDUCTING PROBE RECEIVING PLUG

CROSS REFERENCE TO RELATED APPLICATIONS

This application is a continuation-in-part of an application filed by me on Nov. 13, 1969, Ser. No. 876,349 for Temperature, Pressure And Flow Rate Sensing Probe And Assocaited Gauge Plug now U.S. Pat. No. 3,630,080 and an application filed Nov. 16, 1970 Ser. No. 89,682 for Pressure Conducting Probe Receiving Plug, now abandoned.

BACKGROUND OF THE INVENTION

1. Field of the Invention

The present invention relates to vacuum and pressure measuring means and more particularly to a vessel connected plug removably receiving a probe.

In carrying out many processes it is important that a means be provided for indicating or gauging the pressure of a fluid within a vessel or pipe. It is desirable in obtaining pressure readings of a fluid within a vessel to use a probe connected with a pressure gauge wherein the probe may be successively inserted into special plugs connected at a plurality of positions on the wall of the vessel to obtain pressure or vacuum readings at the respective plug locations. Most probe receiving means presently in use have the probe receiving bore thereof closed by resilient pressure responsive sealing material which tends to deteriorate as a result of heat and pressure during use. Furthermore, the generally circular opening, usually formed in the wall of the probe, tends to "pinch-off" or "cut-out" a small portion of the resilient sealing material, eventually resulting in a pressure leak, necessitating frequent replacing of the seal.

This invention contemplates the use of a centrally bored plug which is threadedly connected with the wall of the vessel at predetermined locations. Intermediate its ends the plug contains a cartridge equipped with a spring urged valve sealing with a counterbored wall and providing a seal for surrounding a pressure and vacuum communicating probe which unseats the valve and moves it toward the vessel for communication with the fluid under pressure or vacuum in the vessel.

2. Description of the Prior Art

U.S. Pat. No. 3,341,082 discloses a dispensing and purging valve means for discharging fluid under pressure from a container wherein a rod member, longitudinally movable within a sleeve-like member, includes a seal surrounding the rod member. Intermediate its ends, the rod member is provided with a circumferential elongated recess permitting passage of the pressurized fluid when the recess spans the position of the rod surrounding seal. This device, while satisfactory for controlling fluid under relatively low pressure, such as one or two hundred p.s.i., would be subject to the undesirable characteristics set forth hereinabove when attempting to contain fluid pressure of from 200 p.s.i. or greater pressure for the reason that such pressures would place the seal surrounding the rod member in tight contact with the periphery thereof and result in damage being done to the surrounding seal as the recessed portion of the rod is moved across the position of the surrounding seal.

The gauging means of this invention is distinctive over the above referred to patent by providing a centrally bored body which coaxially contains a cartridge having a valve connected with a guide rod surrounded by packing within the cartridge. The rod is provided with a relatively narrow longitudinally extending slot which forms a bypass or passageway for fluid pressure communication through the cartridge when the rod is moved toward the pressure containing vessel. The seal surrounding the rod is not damaged by the slot during movement of the rod through the surrounding seal because of the narrow width of the slot when compared to the circumference of the rod. A further characteristic of this rod sealing means is that it permits gauging a vacuum or a pressure within the vessel up to 20,000 p.s.i. without material damage to the seals or loss of pressure or vacuum.

This invention is distinctive over the above first referred to copending application by its bore sealing means and providing a guide rod for moving the spring urged ball valve longitudinally within the fluid passage.

This invention is distinctive over the above last referred to copending application by substituting a ball valve for the piston and providing a resilient seat for the ball valve between the cartridge ends thus assuring positive closing of the bore of the plug and supplementing the packing seal around the ball valve connected rod guide.

SUMMARY OF THE INVENTION

A centrally bored generally cylindrical plug is threadedly connected with the wall of a vessel containing a vacuum or a fluid under pressure to be gauged. The plug is coounterbored from its threaded end for removably receiving a cartridge sealing with the wall forming the counterbore. The cartridge includes a co-axial spring urged ball valve normally closing the plug bore and connected with a guide rod extending through cartridge contained packing which seals with the periphery of the rod. The rod is provided, intermediate its ends, with a longitudinally extending relatively narrow slot providing a vacuum and fluid pressure passageway across the rod seal when the ball valve and rod is moved toward the vessel by a pressure or vacuum communicating probe coaxially received by the plug bore.

The principal object of this invention is to provide a plug means for connection with the wall of a vessel for removably receiving a probe connected with a vacuum or pressure gauge.

DESCRIPTION OF THE PREFERRED EMBODIMENTS

Figure 4:
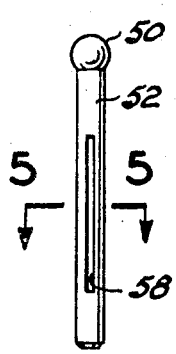
FIG. 4 is an elevational view of the ball valve and connected guide rod.
Figure 5:
FIG. 5 is a horizontal cross-sectional view, to a larger scale, taken substantially along the line 5—5 of FIG. 4.
Figure 7:
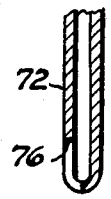
FIG. 7 is a fragmentary vertical cross-sectional view, to a larger scale, of the free end portion of a pressure communicating probe; and, FIG. 8 is a fragmentary vertical cross-sectional view illustrating another manner of connecting the spring to the rod.
Figure 6:
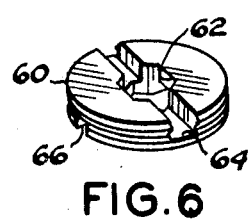
FIG. 6 is a perspective view of a cartridge retainer co-axially received by the plug means.

Like characters of reference designate like parts in those figures of the drawings in which they occur.

In the drawings:

The reference numeral 10 indicates the plug means, as a whole, which is substantially cylindrical in general configuration comprising a body portion 12 and a cartridge unit 14. The body 12 is formed from hexagonal bar stock having its periphery cut away at one end portion to define a wrench engaging head end portion 16 and a cylindrical neck portion 18. The free end of the neck portion 18 is externally threaded, as at 20, for threaded engagement with a threaded bore 22 formed in the wall 24 of a vessel containing a fluid to be gauged. The body 12 is centrally drilled, as at 26, and has a conical-shaped recess 28 co-axially formed in its head end portion. The body is counterbored, as at 30, from its neck end portion with the counterbore terminating in an annular shoulder 32 in spaced relation with respect to the inner limit of the conical recess 28. The wall forming the counterbore is provided with threads 34 extending inwardly of the neck portion of the body substantially coextensive with respect to the external threads 20. The counterbore 30 coaxially receives the cartridge unit 14.

The cartridge unit 14 comprises a transversely divided casing forming two identical parts or halves 36 and 37 for ease in construction and assembly which, when cooperatively coaxially aligned, in end abutting relation, are closely received by the wall forming the counterbore 30 with one end of the cartridge contiguously contacting the body shoulder 32. The overall length of the casing halves is substantially equal to the length of the counterbore 30 inwardly of the threads 34. Each casing half 36 and 37 is provided with a circumferential recess adjacent its respective end portion for receiving seals, such as O-rings, 38 to form a seal with the wall forming the counterbore 30. The casing halves are centrally bored, as at 40 and 41, diametrically equal with the body bore 26 and forming a continuation thereof. One end of each of the casing halves is provided with a coaxial annular recess for receiving a first packing or a seal 42, such an an O-ring, having an inside diameter diametrically slightly smaller than the bores 26 and 40 for the purposes presently explained. The casing halves 36 and 37 are each counterbored from their abutted ends, as at 44 and 45, forming annular shoulders 46 and 47, respectively. The casing shoulders 46 and 47 each have a recess or counterbore coaxially formed therein, for receiving second packing or seals 48 and 49, respectively, such as O-rings similar to the O-ring seal 42. The periphery of the cartridge unit or casing halves 36 and 37 are usually formed of such tolerance or fit with respect to the body counterbore 30 that the cartridge 14 may be removed as a unit for replacing the packing seals, however, for certain installations the tolerance forms an interference fit which does not permit removal of the cartridge unit.

A ball valve 50 is connected, as by welding, with one end surface of a stem or guide rod 52, which is coaxially received by the casing counterbores 44 and 45. Diametrically the ball valve 50 is greater than the diameter of the casing bore 40 and body bore 26. The diameter of the rod is such that it may be slidably received by the casing bores 40 and 41 for the purposes presently explained. The ball valve 50 thus forms a stop and prevents entry of the rod 52 into the casing bore 40 by pressure, contained by the vessel wall 24, acting against the end surface of the rod disposed toward the vessel. The seal 48 forms a seat for the ball valve. If desired the seal 48 may be omitted and a seat formed on the casing wall around the bore 40. Alternatively, a ball valve seat formed of metallic material may replace the seal 48. The overall length of the rod 52 is greater than the combined lengths of the casing counterbores 44 and 45 a distance sufficient to dispose the depending end portion of the rod, as viewed in the drawings, within the casing bore 41 and below the lowermost limit of the seal 49 a distance sufficient to maintain the rod coaxial with the casing bores 40 and 41.

A sleeve 54, having an inside diameter substantially greater than the ball valve 50 and a length substantially coextensive with the combined lengths of the casing counterbores 44 and 45, is coaxially received thereby. One end of the sleeve is closed and centrally bored diametrically substantially equal with the casing bore 41. The respective end surfaces of the sleeve maintain the casing seals 48 and 49 within their respective recesses. The outside diameter of the sleeve 54 preferably forms an interference fit with the walls forming the casing counterbores 44 and 45 to maintain the casing halves in assembled end abutting relation. Obviously, a thin paper-like ring gasket, not shown, may be interposed between abutted ends of the casing halves.

Figure 3:
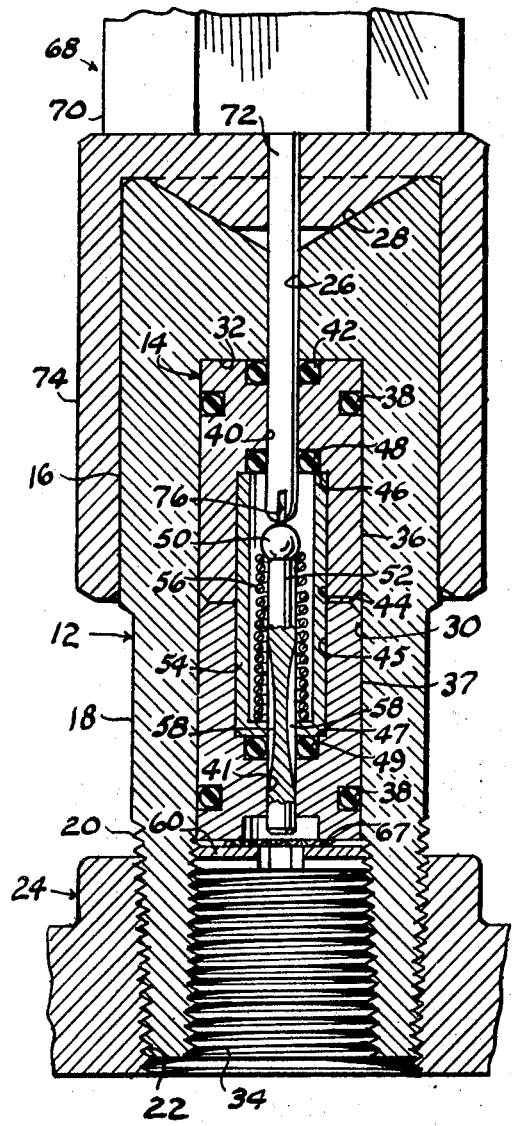
FIG. 3 is a vertical cross-sectional view, similar to FIG. 2, illustrating a fragmentary portion of a probe in vacuum and pressure communicating position on the plug means.

The ball valve 50 is normally maintained in contact with the seal 48 by a resilient means, such as a helical spring 56, co-axially surrounding the rod 52 and interposed between the ball valve 50 and closed end of the sleeve 54. Intermediate its ends the rod 52 is provided with at least one, preferably two, oppositely disposed relatively narrow longitudinally extending slots 58 of sufficient length so that the slots span the position of the rod packing or seal 49 when the ball valve 50 and rod 52 are moved toward the body threads 34, as shown by FIG. 3. The slots provide communication between the interior of the vessel 24 and the interior of the sleeve 54.

The term "relatively narrow", used in describing the width of the rod slots 58, relates to the diameter of the rod. A transverse width, for the slots 58, not greater than one-fourth the diameter of the rod, achieves the desired function. This width of the slots 58, when related to the circumference of the rod, is not greater than one-ninth of the circumference of the rod 52. In addition to providing pressure and vacuum communication across the position of the packing or seal 49 the purpose of the relatively narrow slots is to prevent rupturing or deteriorating the packing seal 49 by repeated movement of the slots 58 across the position of the packing seal when gauging the vessel 24.

Figure 8:
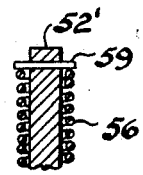
Figure 1:
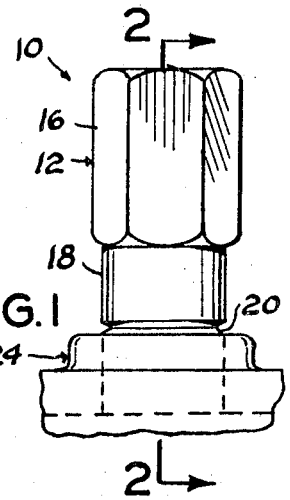
FIG. 1 is an elevational view of the plug means connected with a fragmentary portion of a vessel.

When the plug means 10 is used on evacuated vessels the ball valve may be omitted. To normally maintain the casing bore 41 closed the spring 56, of sufficient tension to overcome the vacuum pull, is preferably similarly installed around the rod. In this event the similarly formed rod 52' (FIG. 8) is provided with a pin 59 extending diametrically through its end portion opposite the vessel to form a shoulder for the spring and a stop to prevent movement of this end portion of the rod into the casing bore 40.

The cartridge means 14 is usually maintained as a unit within the body counterbore 30 by a plate-like retainer 60 comprising an externally threaded disk which is received by the body threads 34. The retainer 60 is provided with a central wrench socket opening 62 providing means for inserting and removing the retainer for installing or replacing the cartridge means 14 and providing communication between opposite ends of the body through the retainer. The retainer is further characterized by transverse grooves 64 and 66, formed in respective end surfaces of the retainer, perpendicular with respect to each other, forming screwdriver slots to facilitate installation and removal of the retainer. A screen 67 is coaxially connected with the casing half 37 and interposed between the retainer and casing.

Pressure communicating probe means 68 is used in gauging the pressure within the vessel 24 and comprises a body portion 70 connected at one end with gauge means, not shown, and coaxially connected at its other end with a stem 72 coaxially surrounded by a skirt 74 which loosely surrounds the body wrench head portion 16 to aid in alignment and protect the stem 72 when not in use. The stem 72 is elongated tubular and is slidably received longitudinally by the body bore 26 and casing bore 40 and having a length sufficient to contact the surface of the ball valve 50 or the adjacent end surface of the rod 52' if the ball valve is omitted and move the rod toward the body threads 34, to the position shown by FIG. 3, wherein the rod slots 58 span the position of the packing or seal 49. The inwardly disposed end portion of the stem 72 is characterized by a relatively narrow slot 76 longitudinally formed in its wall adjacent its free end.

The term "relatively narrow" used in describing the width of the stem slot 76 similarly relates to the diameter of the stem 72. A width for the slot 76 not greater than one-fourth of the diameter of the stem has been found satisfactory. The purpose of the narrow slot 76 is to similarly minimize damage to the sealing rings 42 and 48 by insertion and removal of the stem.

OPERATION

Figure 2:
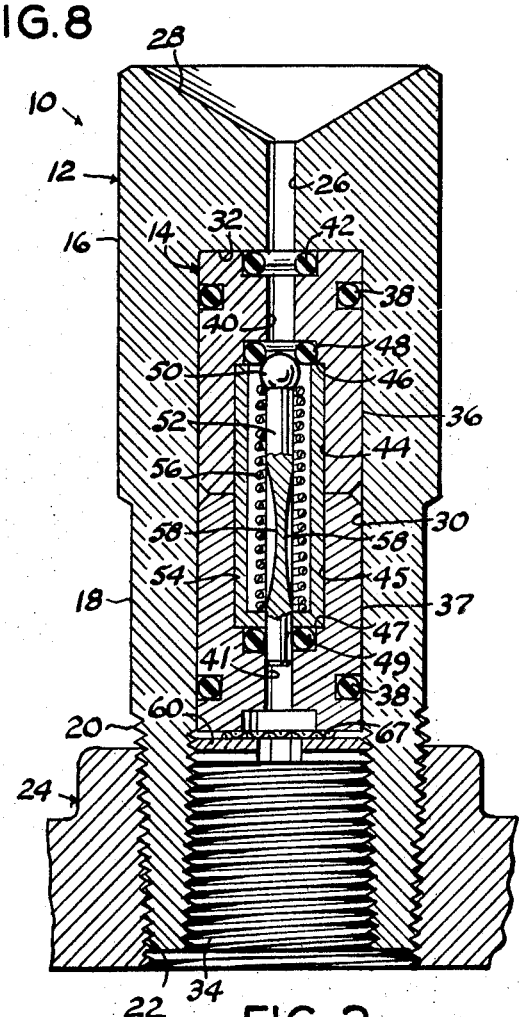
FIG. 2 is a vertical cross-sectional view, to a larger scale, taken substantially along the line 2—2 of FIG. 1.

In operation one of the plug means 10 is installed at each of several selected locations on the vessel 24, or the like. The components of the cartridge means 14 are normally in the position shown by FIG. 2 wherein communication through the body bore 26 is interrupted by the packing seal 49 sealing with the periphery of the rod 52. As is conventional in shop practice, for the rod 52 to be longitudinally slidable within the bore 41 of the casing half 37 and yet permit a seal with the periphery of the rod by the packing seal 49, a close tolerance fit is provided. This tolerance is usually on the order of two to four thousandths of an inch. This tolerance or clearance permits pressure and vacuum communication through the casing bore 41 around the depending end portion of the rod 52 and across the position of the seal 49 by the rod slots 58 when the rod is moved to the position of FIG. 3. This is accomplished by manually placing the gauge probe skirt 74 around the body 12 in a longitudinal sliding action which forms a guide for simultaneously inserting the probe stem 72 into the body bore 26. The inward end of the stem 72 contacts the ball valve 50 and moves it off its seat and toward the body threads 34 by overcoming the resistance of the spring 56 and pressure against the rod and ball valve so that pressure communication through the rod slots 58 is applied to the pressure gauge by entering the probe stem slot 76. While the pressure is being recorded the periphery of the probe stem 72 is sealed with the body and cartridge means by the packing seal 42. After obtaining a reading the probe 58 is removed wherein the spring 56 returns the ball valve 50 and rod 52 to the position of FIG. 2 again interrupting pressure communication through the body bore. The ball valve thus acts as a secondary sealing means to prevent fluid pressure leak through the plug means 10.

Obviously the invention is susceptible to changes or alterations without defeating its practicability, therefore, I do not wish to be confined to the preferred embodiment shown in the drawings and described herein.

I claim:

1. A vacuum and pressure conducting probe receiving plug, comprising:
   an elongated centrally bored body adapted to be connected, at one end, with the wall of a vessel, said body having a counterbore extending inwardly from said one end;
   a casing within the body counterbore, said casing having a longitudinal passageway communicating with and forming a continuation of the bore of said body and having a coaxial counterbore intermediate its ends;
   a rod coaxially received by the casing counterbore and slidably projecting into the casing passageway toward the vessel connected end of said body,
   said rod having a longitudinal slot formed in its outer surface intermediate its ends, the width of the slot being not greater than one-nineth the circumference of the rod for gradually providing pressure communication between the vessel and the counterbore of said casing in response to longitudinal movement of said rod toward the vessel connected end of said body;
   a stop secured to the end of said rod opposite said one end,
   said stop having a major dimension greater than the diameter of said rod for preventing entry of said rod into the other end portion of the casing passageway; and,
   packing means including seals, at the respective end portions of said casing, normally acting to close the casing passageway in combination with said rod.

2. The probe receiving plug according to claim 1 and further including:
   resilient means within the casing counterbore and bearing against said stop for urging said rod away from said one end.

3. The probe receiving plug according to claim 2 in which said stop comprises a ball valve.

4. The probe receiving plug according to claim 3 and further including:
   a valve seat surrounding the casing passageway adjacent said ball valve.

5. The probe receiving plug according to claim 2 in which said casing is transversely divided to form two halves; and, a sleeve coextensive with and closely received by the wall forming the casing counterbore for joining the casing halves together in end abutted relation.

6. The probe receiving plug according to claim 2 and further including:

a retainer engaging the body counterbore wall and adjacent end surface of said casing.

7. The probe receiving plug according to claim 6 and further including:

a screen interposed between said retainer and the adjacent end surface of said casing.

8. An apparatus for testing vacuum and pressure, comprising:

a probe means including an elongated hollow stem having one closed end portion, said closed end portion having a relatively short and narrow longitudinally extending slot in its wall, the width of the slot being not greater than one-fourth the diameter of said stem;

a plug means comprising an elongated body adapted to be connected at one end with the wall of a vessel, said body having a central bore slidably receiving said stem, said body having a counterbore in its vessel connected end;

a casing disposed within the body counterbore, said casing having a longitudinal passageway communicating with the bore of said body, first sealing means surrounding and sealing a peripheral portion of said stem with the wall forming the bore of said body;

a rod within the casing passageway and projecting at one end, toward the vessel connected end of said body;

resilient means within said casing normally biasing said rod away from said one end; and, second sealing means within the casing passageway surrounding and sealing with said rod adjacent its end portion projecting toward said one end, said rod having a longitudinally extending relatively narrow slot, having a width not greater than one-fourth the diameter of the rod, in its wall intermediate its ends, whereby when the inward end of said stem contacts and moves said rod toward the vessel the rod slot spans and provides communication across the position of said second sealing means.

9. The apparatus according to claim 8 and further including:

a ball valve within the casing passageway and secured to the end of said rod opposite said one end.

10. The apparatus according to claim 9 in which the closed end portion of said stem is hemispherical and in which the stem slot occupies a radial position of the hemispherical shape.

11. The apparatus according to claim 10 in which the end portion of said stem opposite its closed end portion is connected with and coaxially surrounded by a skirt, the wall forming the inside diameter of said skirt closely surrounding the end portion of said plug body opposite its vessel connected end.

12. The apparatus according to claim 11 and further including:

a retainer engaging the body counterbore wall and adjacent surface of said casing; and, a screen interposed between said retainer and the adjacent end surface of said casing.

* * * * *